Feb. 21, 1950  R. A. HOWARD  2,498,548
COMPARATOR CIRCUIT
Filed Oct. 10, 1945
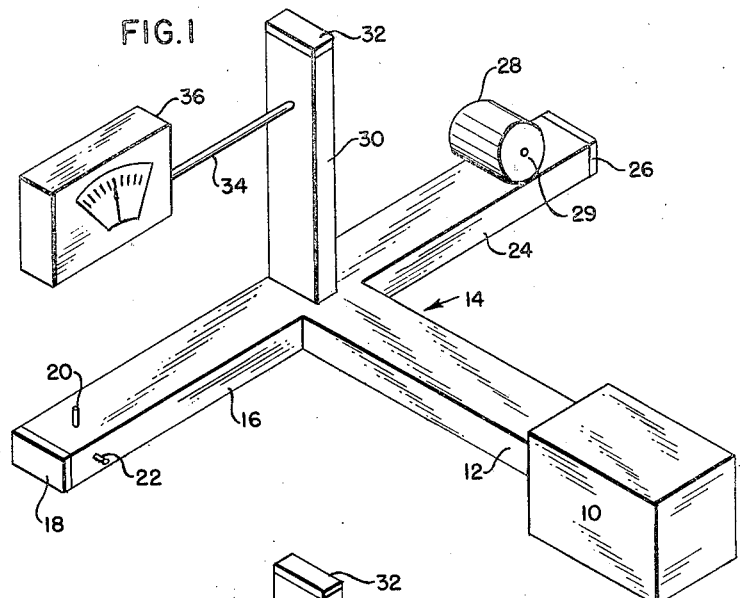
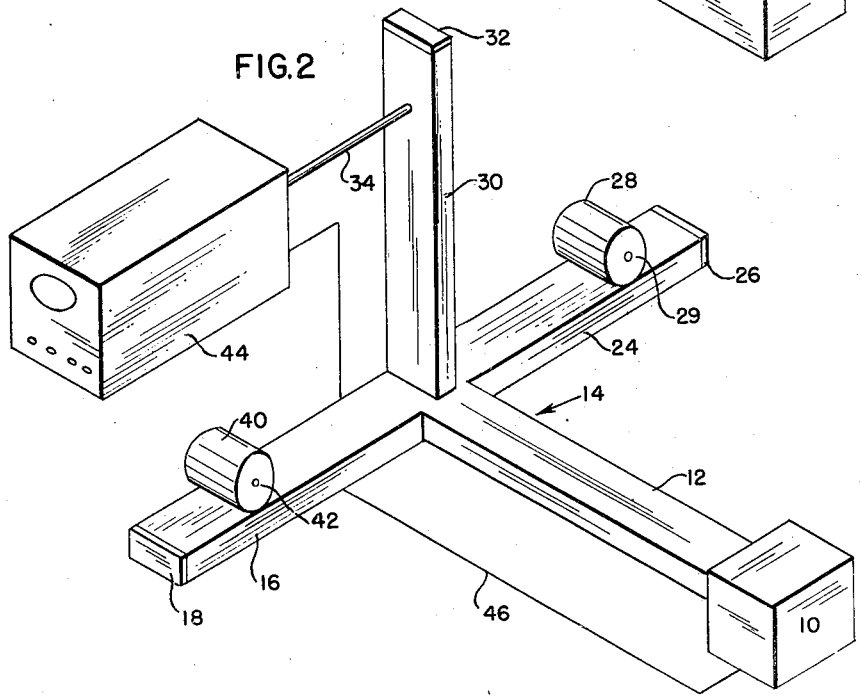
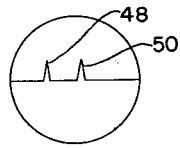
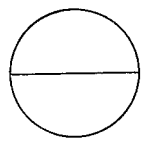
*INVENTOR.*
ROBERT A. HOWARD
*BY*
William D. Hall.
ATTORNEY Patented Feb. 21, 1950

2,498,548

UNITED STATES PATENT OFFICE 2,498,548

COMPARATOR CIRCUIT

Robert A. Howard, Lexington, Mass., assignor, by mesne assignments, to the United States of America as represented by the Secretary of War Application October 10, 1945, Serial No. 621,572

8 Claims. (Cl. 250—39)

This invention relates to measuring devices and more particularly to devices adapted to measure the frequency of signals in the microwave region.

In many applications in the electronic art it is necessary to accurately measure the frequency of a microwave signal, and in other applications in this art it is necessary to tune a circuit element, for example a cavity resonator or other similar device, to resonate at the frequency of a given signal or at the resonant frequency of a second cavity. Still other phases of the electronic art require calibration of elements such as signal generators, cavities, and so forth. The difficulties involved in performing such operations are well known in the art, and any device that will successfully perform these functions is a very useful piece of laboratory or test equipment.

It is an object of the present invention, therefore, to provide a novel circuit for accurately measuring the frequency of a microwave signal.

A second object of this invention is to provide means for accurately calibrating meters, cavity resonators, and other similar circuit elements that operate in the microwave region.

For a better understanding of the invention, together with other and further objects thereof, reference is had to the following description taken in connection with the accompanying drawing in which:

Fig. 1 shows an embodiment of the present invention particularly adapted for use as a transmission type wavemeter;

Fig. 2 shows a second embodiment of the present invention particularly adapted for use in calibrating cavity resonators or similar circuit elements, and Figs. 3 and 4 are views of a cathode ray tube screen that forms part of the embodiment of the invention shown in Fig. 2.

Referring now to Fig. 1 of the drawing, there is shown a signal generator 10 connected to one arm 12 of a wave guide "Magic-T" or T-bridge 14. The coupling between generator 10 and arm 12 may be any type of connection well known in the art that will transfer the signal from the generator 10 to arm 12. A second arm 16 of T-bridge 14 is terminated in an impedance represented schematically by a block 18. Tuning screws 20 and 22 are inserted in the broad and narrow walls respectively of arm 16 at some point close to the end of arm 16 that is terminated by block 18. A third arm 24 of T-bridge 14 is terminated in an impedance that is represented schematically by a block 26. A cavity resonator 28, provided with a means 29 for adjusting its resonant frequency, is coupled to arm 24 of the T-bridge 14 at a point intermediate the ends of arm 24. The coupling between cavity 28 and arm 24 may be afforded by suitable probes (not shown) inserted in cavity 28 and arm 24, however, the coupling is not limited to this means since coupling by means of a slot or a suitably joined wave guide or coaxial line is equally acceptable.

The fourth arm 30 of T-bridge 14 is terminated by a suitable impedance represented schematically in Fig. 1 by a block 32. A crystal detector (not shown) is inserted in arm 30 at the point that a coaxial line 34 joins arm 30. Coaxial line 34 supplies the detected output of the crystal detector to a meter 36.

The construction and operation of the "Magic-T" or T-bridge 14 shown in Fig. 1 is illustrated and explained in the copending applications of Robert L. Kyhl Serial No. 580,014, filed February 27, 1945, and Robert H. Dicke Serial No. 581,695, filed March 8, 1945, and Serial No. 586,413, filed April 3, 1945. While reference to the above-mentioned copending applications will aid in understanding the operation of this invention, those skilled in the art will find that the following description, including briefly the operation of this type of bridge as applied to this invention, contains sufficient details to make this reference unnecessary. The characteristics of the T-bridge employed in this invention are:

(1) If a signal is applied to arm 12 of the T-bridge 14 of Fig. 1 and the impedances presented at their junction by arm 16 and 24 are equal, no signal will pass into arm 30 of the T-bridge; and (2) If the impedances presented by these two arms 16 and 24 are not equal, a signal will pass from arm 12 to arm 30. It is understood, of course, that arms 12, 16, 24 and 30 of T-bridge 14 are sections of wave guide of the proper size to transmit the signal from generator 10.

In the device shown in Fig. 1 blocks 18 and 26 will normally be metallic plates that short circuit the ends of arms 16 and 24 although a resistance strip termination or any other common type of impedance termination may be used if desired. Probes 20 and 22 are provided to illustrate one method of balancing the effect of the impedance of cavity resonator 28 at all frequencies except the resonant frequency of resonator 28. The electrical lengths of arms 16 and 24 and the adjustment of plugs 20 and 22 are so selected that the impedances presented by arms 16 and 24, respectively, at the point of junction of these arms with arms 12 and 30 are substantially equal at all frequencies within a range of frequencies extending over a comparatively wide band on either side of the resonant frequency of cavity 28 but not including a narrow band of frequencies including the resonant frequency of cavity 28.

The crystal detector in arm 30, together with termination 32, is preferably adjusted so that arm 30 is terminated in its characteristic impedance although it is not essential that such a termination be made. If the preferred type of termination is used, block 32 represents a metallic plate that short circuits the end of arm 30 and the crystal detector that is placed in arm 30 has an impedance equal to the characteristic impedance of arm 30. This detector is placed approximately one-quarter of a wavelength from the end of arm 30 terminated by impedance 32.

To utilize the circuit of Fig. 1 as a frequency-measuring device, the signal to be measured is introduced into arm 12 of T-bridge 14. Meter 36 will normally read zero since no energy is supplied to the detector. Cavity resonator 28 is now slowly tuned by adjustment 29 until it is resonant at the frequency of the signal in arm 12. When cavity 28 is thus tuned to resonance, its impedance to the signal present in arm 24 will change abruptly (the rapidity of change, of course, depending on the losses in the cavity) so that the impedances presented by arms 16 and 24 at their junction is no longer equal. A signal is now coupled from arm 12 to arm 30. The signal in arm 30 is rectified by the crystal detector and, therefore, causes a deflection on meter 36. If the losses in cavity resonator 28 are small, signals will be coupled from arm 12 to arm 30 for only a very narrow band of frequencies so that adjustment 29 may be calibrated to read the frequency of the signals in guide 12.

It should be obvious to those skilled in the art that if generator 10 is provided with means for accurately indicating the frequency of the signal supplied to arm 12, this same apparatus may be employed to calibrate an adjustable cavity resonator, the frequency calibration of which is not known.

Reference is now had to Fig. 2 of the drawing wherein there is shown a second embodiment of the present invention. This embodiment employs T-bridge 14 arms 24 and 30 of which are terminated in the manner described in connection with Fig. 1. The termination of arm 16 of this bridge differs from the termination shown in Fig. 1 in that tuning plugs 20 and 22 have been replaced by a cavity resonator 40 having a frequency adjustment 42. While differing greatly physically, this termination is very similar electrically to the termination of Fig. 1 since plugs 20 and 22 of Fig. 1 were adjusted to balance the impedance of cavity resonator 28.

In this embodiment of the invention meter 36 is replaced by a cathode ray oscilloscope 44. An electrical connection 46 is made from oscilloscope 44 to signal generator 10. The signal from the crystal detector (not shown) is applied to the vertical deflection plates of oscilloscope 44. The signal may be directly connected to the vertical deflection plates or it may be connected through suitable amplifiers depending upon the strength of the signal applied to the detector and the deflection sensitivity of the oscilloscope. The horizontal deflection of the electron beam in oscilloscope 44 is preferably provided by means of a sawtooth voltage applied to the horizontal deflection plates. Circuits for providing this voltage are normally found in most oscilloscopes.

To calibrate a cavity resonator with this apparatus, one of the resonators shown in Fig. 2, for example resonator 28, is employed as a frequency standard. This requires that adjustment 29 be accurately calibrated to indicate the resonant frequency of cavity 28 over the range of frequencies to be calibrated. Cavity resonator 40 is the resonator to be calibrated. Signal generator 10 is adapted so that the signal supplied to arm 12 is frequency modulated to cover the range of frequencies to be calibrated. This frequency modulation is preferably of the type in which the frequency rises linearly in time from the lower limit to the upper limit and then rapidly returns to the lower limit. Those skilled in the art will recognize this condition as one requiring a sawtooth modulation signal. Preferably, the modulation signal is in phase with the horizontal sweep voltage in oscilloscope 44 since this relationship causes the horizontal deflection of the electron beam in the oscilloscope to be indicative of the frequency of the signal generator. This relationship may be provided by any of a number of means well known in the art, one of such means being to apply the sawtooth sweep voltage from oscilloscope 44 (through suitable amplifiers if necessary) to a microwave oscillator in signal generator 10 that has a frequency determined by the potential of one of its elements, for example an anode potential. Connection 46 is provided to connect the synchronizing signal from oscilloscope 44 to signal generator 10.

The electrical length and termination of arms 16 and 24 are so adjusted that the impedance presented by each arm to a signal in arm 12 is the same provided that the frequency of the signal is not the resonant frequency of either resonator 28 or resonator 40. If it is assumed that resonator 40 is not tuned to the same frequency as resonator 28, the indication on the screen of oscilloscope 44 will be as shown in Fig. 3. It will be noted that two pips or pulses 48 and 50 occur in this indication. These pips represent the output of the crystal detector when the frequency of the signal from generator 10 passed through the resonant frequency of resonators 40 and 28, respectively. In this case it can be seen that resonator 40 is tuned to a lower frequency than is resonator 28. If resonator 40 were tuned to a higher frequency than resonator 28, pip 48 would appear to the right of pip 50. Adjustment 42 on resonator 40 is now moved so that the resonant frequency of this cavity is raised. This will cause pips 48 and 50 to move closer together. Fig. 4 shows the screen on oscilloscope 44 when resonators 40 and 28 are tuned to the same frequency. It will be noted that no pip occurs in the base line under these conditions.

The reason that pips 48 and 50 do not add to form a pip of twice the amplitude as might at first be supposed is that the impedances of resonators 40 and 28 change in the same direction at resonance so that the impedances of arms 16 and 24 at their point of junction remain substantially equal. The elimination of the pipe at coincidence rather than the addition permits greater accuracy in setting adjustment 42. When cavities 40 and 28 have been tuned to the same frequency, the frequency as read from adjustment 29 may be marked on adjustment 42 or the position of control 42 and the setting of adjustment 29 may be recorded for the purpose of plotting a calibration curve. When the desired data has been recorded, adjustment 29 is moved to a new setting and the operation described above is repeated.

It will be recognized by those familiar with T-bridges that the indication of Fig. 4 is slightly idealized since complete elimination of the pips will result only if the impedances of resonators 40 and 28 change by equal amounts in the same direction at resonance. If the impedances do not change by equal amounts but do change in the same direction, the amplitude of the combined pips will be greatly reduced although the pip is not entirely eliminated. The reduction in amplitude gives an easily readable indication of the time of coincidence. If the impedance at resonance of the two elements, in this case the resonators 28 and 40, do not change in the same direction, the coincidence of the pips as well as the change in amplitude of the resultant pip will indicate when the two elements are tuned to the same frequency.

It should be apparent from the foregoing discussion that this apparatus is by no means limited to calibrating cavity resonators and signal generators since any type of wavemeter (or any other device) in which a change in impedance occurs at one or more frequencies may be compared with any other device exhibiting a similar impedance characteristic.

While there has been described what are at present considered the preferred embodiments of the invention, it is obvious to those skilled in the art that various changes and modifications may be made therein without departing from the invention.

What is claimed is:

1. A frequency measuring device comprising a wave guide T-bridge having a first, a second, a third and a fourth arm, a source of signals to be measured, means for connecting said source of signals to said first arm of said T-bridge, an adjustable cavity resonator, means for connecting said resonator to said second arm of said T-bridge, means for terminating said second arm in a suitable impedance, a first and a second tuning plug, means for inserting said plugs at two points in said third arm of said T-bridge, means for terminating said third arm in a suitable impedance, means for terminating said fourth arm of said T-bridge in a suitable impedance, crystal detector means for detecting signals present in said fourth arm, a meter, means for connecting the output of said crystal detector to said meter, means for changing the resonant frequency of said cavity resonator, and means for indicating the setting on said resonator that causes an indication on said meter, said four arms being so positioned and the impedances presented by said second and third arms so obtained that an indication appears on said meter only when the resonant frequency of said resonator is equal to the frequency of the signal to be measured.

2. In a testing apparatus a signal generator for producing a frequency modulated signal, a wave guide T-bridge having a first, a second, a third, and a fourth arm, means for connecting said signal generator to said first arm of said T-bridge, a calibrated adjustable cavity resonator, means for connecting said resonator to said second arm of said T-bridge, means for suitably terminating said second arm, means for suitably terminating said third arm of said T-bridge, means for connecting the device to be measured to said third arm of said T-bridge, means for suitably terminating said fourth arm of said T-bridge, crystal detector means located in said fourth arm for detecting signals present in this arm, an oscilloscope, means for synchronizing the operation of said oscilloscope and said signal generator, means for connecting the output of said detector to said oscilloscope, whereby said oscilloscope indicates the difference in resonant frequency, if any, between said resonator and said device to be tested, means associated with said resonator for reducing said above-mentioned difference in frequency to zero, and means for indicating the frequency to which said resonator is tuned.

3. A comparator circuit comprising a wave guide T-bridge having a first, a second, a third and a fourth arm, a signal generator, means for connecting said signal generator to said first arm of said T-bridge, a first and a second impedance, at least one of said impedances having a non-linear frequency response characteristic, means for terminating said second and said third arms with said first and second impedances respectively, means for terminating said fourth arm of said T-bridge, means for detecting the presence of signals in said fourth arm, indicator means for indicating the presence of said detected signals, said apparatus operating in combination to produce an indication on said indicator means when an unbalance in impedance occurs in said second and third arms of said T-bridge.

4. A comparator circuit comprising a waveguide T-bridge having a first, a second, a third, and a fourth arm, means for coupling a variable frequency electromagnetic signal into said first arm, a first and a second electrical impedance means coupled to said second and said third arms respectively, at least one of said impedance means being frequency sensitive and at least one of said impedance means being adjustable, means for detecting the presence of a signal in said fourth arm, and means for indicating the frequencies at which signals are detected in said fourth arm whereby the relationship between a known electrical characteristic and an unknown electrical characteristic may be determined.

5. An ultra high frequency device for measuring the resonant frequency of an ultra high frequency resonator comprising four waveguide arms of substantially the same impedance connected together at a common junction point, a pair of said arms being aligned, the remaining pair of said arms being perpendicular to one another and to said aligned pair and being connected respectively in series and in parallel with said aligned pair, adjustable impedance means coupled to one arm of one of said pairs of arms, means for coupling the unknown resonator to the other arm of said one pair, adjustable means for introducing a frequency-variable signal into one arm of the other of said pairs of arms, and means coupled to the other arm of said other pair of arms for indicating the amplitude of the signal passed by said one pair of arms.

6. An ultra high frequency device for measuring the resonant frequency of an ultra high frequency resonator comprising four waveguide arms of substantially the same impedance connected together at a common junction point, two of said arms being aligned, the remaining two of said arms being perpendicular to one another and to said aligned arms and being connected respectively in series and in parallel with said aligned arms, adjustable means for introducing a frequency-variable signal into one of said two remaining arms, a known adjustable impedance means coupled to one of said aligned arms, means for coupling the unknown resonator to the other of said aligned arms, and means coupled to the other of said remaining two arms for indicating the amplitude of the signals passed by said aligned arms.

7. An ultra high frequency device for measuring the resonant frequency of a cavity resonator comprising four waveguide arms of substantially the same impedance connected together at a common junction point, two of said arms being aligned, the remaining two of said arms being perpendicular to one another and to said aligned arms and being connected respectively in series and in parallel with said aligned arms, adjustable means for introducing a frequency-variable signal into one of said two remaining arms, an adjustable means providing an impedance independent of frequency coupled to one of said aligned arms, means for coupling the cavity resonator to the other of said aligned arms, and means coupled to the other of said remaining two arms for indicating the amplitude of the signal passed by said aligned arms.

8. An ultra high frequency device for calibrating a cavity resonator comprising four wave guide arms of substantially the same impedance connected together at a common junction point, two of said arms being aligned, the remaining two of said arms being perpendicular to one another and to said aligned arms and being connected respectively in series and in parallel with said aligned arms, a source of a signal linearly variable in frequency coupled to one of said two remaining arms, means for coupling a calibrated cavity resonator to one of said aligned arms, means for coupling the unknown cavity resonator to the other of said aligned arms, an oscilloscope coupled to the other of said remaining two arms for indicating the amplitude of signals passed by said aligned arms, and synchronizing means coupling said oscilloscope to said signal source whereby there are obtained indications of the frequency as well as amplitude of signals passed by said aligned arms.

ROBERT A. HOWARD.

REFERENCES CITED

The following references are of record in the file of this patent:

UNITED STATES PATENTS

| Number | Name | Date |
|---|---|---|
| 2,379,165 | Lawrence | June 26, 1945 |

FOREIGN PATENTS

| Number | Country | Date |
|---|---|---|
| 116,110 | Australia | Nov. 19, 1942 |